US010040456B2

(12) United States Patent
West et al.

(10) Patent No.: US 10,040,456 B2
(45) Date of Patent: Aug. 7, 2018

(54) SYSTEM AND METHOD FOR HILL CLIMBING GEAR SELECTION

(71) Applicant: Allison Transmission, Inc., Indianapolis, IN (US)

(72) Inventors: Stephen T. West, New Palestine, IN (US); John A. Byerly, Carmel, IN (US); Jared S. Shattuck, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/355,488

(22) Filed: Nov. 18, 2016

(65) Prior Publication Data

US 2018/0141554 A1    May 24, 2018

(51) Int. Cl.
| | |
|---|---|
| *B60W 30/188* | (2012.01) |
| *B60W 10/06* | (2006.01) |
| *B60W 10/11* | (2012.01) |
| *B60W 50/14* | (2012.01) |

(52) U.S. Cl.
CPC ........ *B60W 30/1882* (2013.01); *B60W 10/06* (2013.01); *B60W 10/11* (2013.01); *B60W 50/14* (2013.01); *B60W 2050/146* (2013.01); *B60W 2510/1005* (2013.01); *B60W 2520/105* (2013.01); *B60W 2710/0644* (2013.01); *B60W 2710/0677* (2013.01); *B60W 2710/1005* (2013.01); *B60W 2720/10* (2013.01)

(58) Field of Classification Search
None
See application file for complete search history.

(56) References Cited

U.S. PATENT DOCUMENTS

| | | | | |
|---|---|---|---|---|
| 4,823,646 A | * | 4/1989 | Yoshimura | .......... F16H 61/0213 477/144 |
| 4,856,628 A | | 8/1989 | Momiyama | |
| 5,231,897 A | * | 8/1993 | Morita | ................ F16H 61/0213 477/120 |

(Continued)

FOREIGN PATENT DOCUMENTS

| | | |
|---|---|---|
| DE | 60304192 T2 | 3/2007 |
| WO | WO2004010031 A2 | 1/2004 |

(Continued)

OTHER PUBLICATIONS

Notification, International Search Report, and Written Opinion of the International Searching Authority for PCT/US2017/043117 received from the International Searching Authority of the European Patent Office, dated Oct. 5, 2017, 17 pages.

*Primary Examiner* — Justin Holmes
(74) *Attorney, Agent, or Firm* — Faegre Baker Daniels LLP

(57) ABSTRACT

A multi-speed automatic transmission having a control circuit for managing a hill climb event is provided. The control circuit may detect the hill climb event, such as by identifying when an upshift from a climb gear to an upshift gear would cause deceleration on a hill. The control circuit may also respond to the hill climb event based on desired performance characteristics, including fuel economy, speed, acceleration, and other performance characteristics. In one embodiment, the control circuit responds to the hill climb event by cycling the multi-speed automatic transmission between the climb gear and the upshift gear.

20 Claims, 10 Drawing Sheets

(56) References Cited

U.S. PATENT DOCUMENTS

| | | | |
|---|---|---|---|
| 5,873,802 A | 2/1999 | Tabata et al. | |
| 5,911,771 A | 6/1999 | Reichart et al. | |
| 6,076,036 A | 6/2000 | Price et al. | |
| 6,202,780 B1 * | 3/2001 | Tanaka | B60K 31/047 180/179 |
| 6,874,383 B2 | 4/2005 | Sayman et al. | |
| 7,311,637 B2 | 12/2007 | Kitamura et al. | |
| 2002/0013650 A1 * | 1/2002 | Kusafuka | F16H 61/0213 701/51 |
| 2006/0116239 A1 | 6/2006 | Kumazawa et al. | |
| 2008/0177451 A1 * | 7/2008 | Saitou | F16H 61/0213 701/55 |
| 2009/0171542 A1 * | 7/2009 | Sugiura | F16H 61/0213 701/52 |
| 2009/0233760 A1 * | 9/2009 | Silveri | B60K 6/442 701/70 |
| 2009/0234549 A1 * | 9/2009 | Silveri | B60K 6/442 701/70 |
| 2013/0035829 A1 | 2/2013 | Tiberg | |
| 2013/0304340 A1 | 11/2013 | Shattuck et al. | |
| 2014/0309897 A1 | 10/2014 | Ly | |

FOREIGN PATENT DOCUMENTS

| | | |
|---|---|---|
| WO | WO2005066524 A1 | 7/2005 |
| WO | WO2014003655 A1 | 1/2014 |
| WO | WO/2015/014619 A1 | 2/2015 |

\* cited by examiner

SYSTEM AND METHOD FOR HILL CLIMBING GEAR SELECTION

FIELD OF THE DISCLOSURE

The present disclosure relates to a multi-speed automatic transmission and, in particular, to a multi-speed automatic transmission having a control circuit for managing a hill climb event.

BACKGROUND OF THE DISCLOSURE

Vehicular systems having prime movers coupled to multi-speed automatic transmissions are known. In certain situations, such as when climbing a steep and/or long hill, the vehicular system may lack sufficient power to make use of all the forward speed ratios of the multi-speed automatic transmission. If the multi-speed automatic transmission continues to operate in its current speed ratio, the prime mover may run at maximum speed, which consumes excess fuel. On the other hand, if the multi-speed automatic transmission upshifts to a higher gear, the prime mover may lack sufficient power to adequately hold the grade, which may cause deceleration and driver annoyance.

SUMMARY

The present disclosure relates to a multi-speed automatic transmission and, in particular, to a multi-speed automatic transmission having a control circuit for managing a hill climb event. The control circuit may detect the hill climb event, such as by identifying when an upshift from a climb gear to an upshift gear would cause deceleration on a hill. The control circuit may also respond to the hill climb event based on desired vehicle performance characteristics, including fuel economy, speed, acceleration, and other performance characteristics. In one embodiment, the control circuit responds to the hill climb event by cycling the multi-speed automatic transmission between the climb gear and the upshift gear.

In some instances throughout this disclosure and in the claims, numeric terminology, such as first, second, third, and fourth, is used in reference to various components, speed ratios, and other items. Such use is not intended to denote an ordering of the components. Rather, numeric terminology is used to assist the reader in identifying the component being referenced and should not be narrowly interpreted as providing a specific order of components.

In an exemplary embodiment of the present disclosure, a vehicular system is provided that is configured to climb a hill. The system includes a multi-speed automatic transmission including an input member and an output member operatively coupled to the input member, the multi-speed automatic transmission being configurable in a plurality of forward speed ratios between the input member and the output member, the plurality of forward speed ratios including at least a first forward speed ratio and a second forward speed ratio, and a control circuit operatively coupled to the multi-speed automatic transmission, the control circuit configuring the multi-speed automatic transmission to establish each of the plurality of forward speed ratios, and the control circuit identifying a hill climb event when an upshift from the first forward speed ratio to the second forward speed ratio would decelerate the vehicular system on the hill.

In another exemplary embodiment of the present disclosure, a vehicular system is provided that is configured to climb a hill. The system includes a multi-speed automatic transmission including an input member and an output member operatively coupled to the input member, the multi-speed automatic transmission being configurable in a plurality of forward speed ratios between the input member and the output member, the plurality of forward speed ratios including at least a first forward speed ratio and a second forward speed ratio, the system having a first operating range in which the system achieves non-negative acceleration up the hill in the first forward speed ratio and a second operating range in which the system achieves non-negative acceleration up the hill in the second forward speed ratio, and a control circuit operatively coupled to the multi-speed automatic transmission, the control circuit configuring the multi-speed automatic transmission to establish each of the plurality of forward speed ratios, and the control circuit identifying a hill climb event when the first operating range and the second operating range are mutually exclusive.

In yet another exemplary embodiment of the present disclosure, a method is provided for operating a vehicle having a multi-speed automatic transmission operable in a first forward speed ratio and a second forward speed ratio. The method includes the steps of: determining a maximum speed capable of achieving non-negative acceleration on a hill in the first forward speed ratio, wherein the maximum speed is one of a maximum engine speed and a maximum transmission output speed; determining a minimum speed capable of achieving non-negative acceleration on the hill in the second forward speed ratio, wherein the minimum speed is a corresponding one of a minimum engine speed and a minimum transmission output speed; and identifying a hill climb event when the maximum speed is less than the minimum speed.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
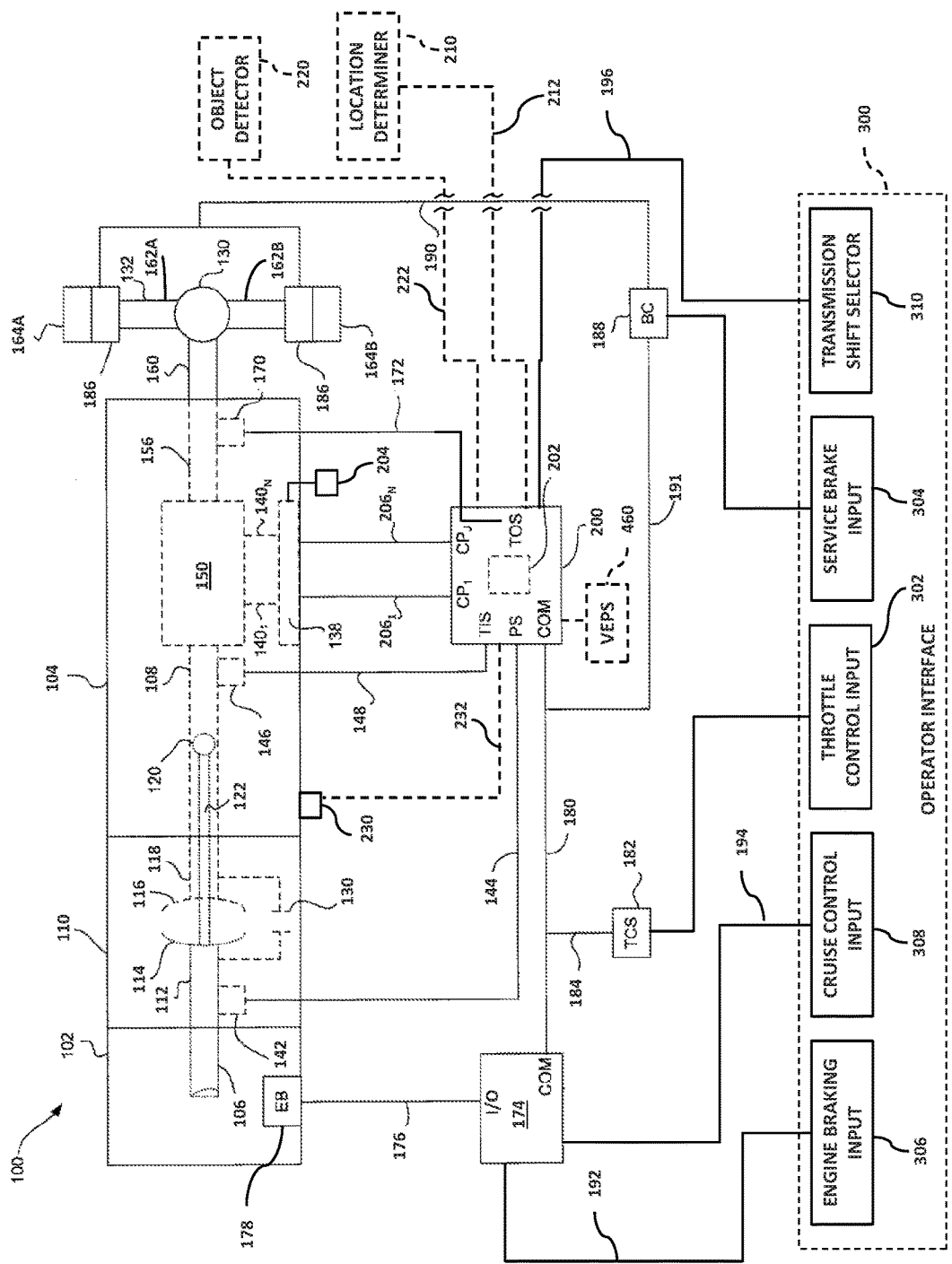
FIG. 1 illustrates a block diagram and schematic view of one illustrative embodiment of a powered vehicular system having a multi-speed automatic transmission.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

Referring now to FIG. 1, an exemplary schematic view of a vehicular system 100 is shown. The vehicular system 100 includes a prime mover 102 operatively coupled to a multi-speed automatic transmission 104. Exemplary prime movers include internal combustion engines, electric motors, hybrid power systems, and other suitable power systems.

Figure 2:
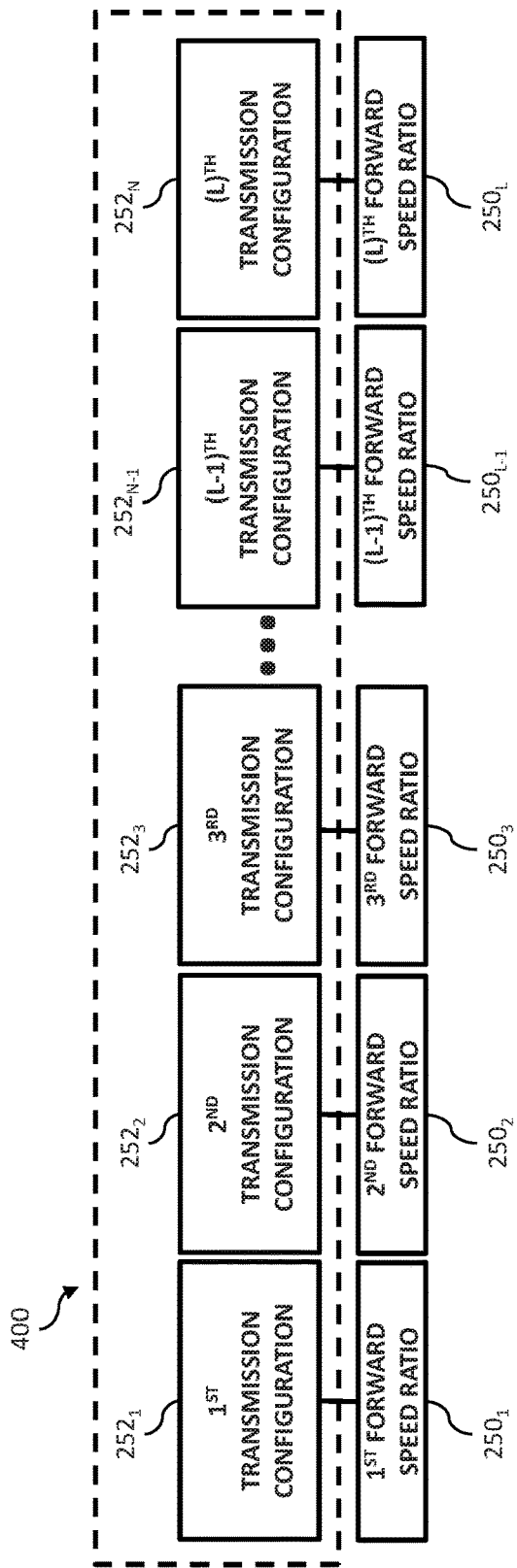
FIG. 2 illustrates a representative view of a plurality of forward speed ratios of the multi-speed automatic transmission of FIG. 1.

As used herein, the term multi-speed automatic transmission is defined as a transmission being configurable in a plurality of forward speed ratios of the output shaft to the input shaft wherein the configuration of the transmission is controlled through a transmission control circuit 200. As explained herein, transmission control circuit 200 includes a shift logic 400 which includes configuration settings $252_1$-$252_L$ (see FIG. 2), wherein L is a positive integer equal to 2 or greater, to configure the components of multi-speed automatic transmission 104 in respective forward speed ratios $250_1$-$250_L$. Multi-speed automatic transmissions may also include one or more reverse speed ratios. Exemplary multi-speed automatic transmissions include automatic transmissions and automated manual transmissions.

One exemplary automatic transmission includes a plurality of planetary gearsets having a plurality of selective couplers which are controlled by transmission control circuit 200 to configure the transmission in the various forward speed ratios. One exemplary automated manual transmission includes at least one gear carried by the input shaft, at least one gear carried by at least one countershaft, at least one gear carried by the output shaft, and a plurality of synchronizers or couplers that couple together various arrangements of the gears and/or shafts to achieve the plurality of forward speed ratios of the output shaft to the input shaft. Exemplary automated manual transmissions include both sliding mesh transmissions and constant mesh transmissions. Exemplary multi-speed automatic transmissions include both transmissions which continuously provide power from the input shaft to the output shaft during shifting and transmissions wherein power from the input shaft to the output shaft is interrupted during shifting.

Prime mover 102 includes an output shaft 106 that is operatively coupled to an input shaft 108 of multi-speed automatic transmission 104. In one embodiment, output shaft 106 of prime mover 102 is coupled to input shaft 108 of multi-speed automatic transmission 104 through a clutch (not shown). In the illustrated embodiment, prime mover 102 indirectly rotates input shaft 108 of multi-speed automatic transmission 104 through a torque converter 110. Output shaft 106 of prime mover 102 rotatably drives an input shaft 112 of torque converter 110. Input shaft 112 is fixedly coupled to an impeller or pump 114. Torque converter 110 further includes a turbine 116 that is coupled to a turbine shaft 118. A coupling fluid is provided in torque converter 110 such that a rotation of pump 114 causes through the fluid a corresponding rotation of turbine 116 and turbine shaft 118. Turbine shaft 118 is coupled to input shaft 108 of multi-speed automatic transmission 104.

In the illustrated embodiment, torque converter 110 includes a lockup clutch 130. Lockup clutch 130 is connected between pump 114 and turbine 116 of torque converter 110. Lockup clutch 130 provides a fixed coupling between pump 114 and turbine 116 when engaged and permits rotation of turbine 116 relative to pump 114 when disengaged. Generally, lockup clutch 130 is disengaged during certain operating conditions such as vehicle launch, low speed, and certain gear shifting conditions. Lockup clutch 130 is generally engaged at higher speeds or for certain gears of multi-speed automatic transmission 104. When engaged, lockup clutch 130 fixedly couples turbine shaft 118 to output shaft 106 of prime mover 102.

Multi-speed automatic transmission 104, in the illustrated embodiment, includes an internal pump 120 for building pressure within different fluid flow circuits (e.g., main circuit, lube circuit, etc.) of multi-speed automatic transmission 104. Internal pump 120 may be driven by a shaft 122 that is coupled to output shaft 106 of prime mover 102. Thus, prime mover 102 may rotate shaft 122 to drive internal pump 120 and build pressure within the various fluid flow circuits of multi-speed automatic transmission 104. Internal pump 120 may also regulate fluid pressure in torque converter 110.

Figure 3A:
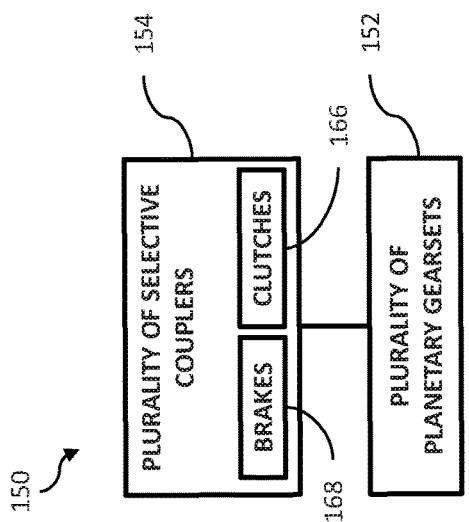
FIG. 3A illustrates a representative view of an exemplary planetary gear transmission of the powered vehicle system of FIG. 1 having a plurality of planetary gearsets and a plurality of selective couplers.

In the illustrated embodiment, multi-speed automatic transmission 104 includes a multi-speed planetary transmission 150. Referring to FIG. 3A, multi-speed planetary transmission 150 includes a plurality of planetary gearsets 152 and a plurality of selective couplers 154 which are operatively coupled to the plurality of planetary gearsets 152. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. Each of the sun gear, the planet carrier, and the ring gear of a respective planetary gearset of the plurality of planetary gearsets 152 may be fixedly coupled to one or more of input shaft 108; an output shaft 156 of multi-speed planetary transmission 150; another one or more of the sun gear, the planet carrier, and the ring gear of one or more of the plurality of planetary gearsets; one or more of the selective couplers; a stationary member of the transmission, such as a housing; and combinations thereof.

It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier. Although multi-speed automatic transmission 104 is illustrated as multi-speed planetary transmission 150 in FIG. 3A, multi-speed automatic transmission 104 may alternatively be structured in other arrangement to provide a plurality of forward speed ratios or gears.

As used herein, a selective coupler 154 is a device which may be actuated to fixedly couple two or more components together. A selective coupler 154 fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch 166. A clutch 166 couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake 168. A brake 168 couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers 154 may be actively controlled devices or passive devices. Exemplary actively controlled devices include hydraulically actuated clutch or brake elements and electrically actuated clutch or brake elements. Returning to FIG. 1, multi-speed automatic transmission 104 further includes an electro-hydraulic system 138 that is fluidly coupled to multi-speed planetary transmission 150 via a number, N, of fluid paths, $140_1$-$140_N$, where N may be any positive integer. In response to control signals $206_1$-$206_N$ from transmission control circuit 200, electro-hydraulic system 138 selectively cause fluid to flow through one or more of the fluid paths, $140_1$-$140_N$, to thereby control the engagement or disengagement of selective couplers 154 of multi-speed planetary transmission 150.

In addition to coupling through selective couplers 154, various ones of the sun gears, the planet carriers, and the ring gears of the planetary gearsets 152 may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

One or more rotating components, such as shafts, drums, and other components, may be collectively referred to as an interconnector when the one or more components are fixedly coupled together. Interconnectors may further be fixedly coupled to one or more gearset components of planetary gearsets 152 and/or one or more selective couplers 154.

Multi-speed planetary transmission 150 transfers torque from input shaft 108 to output shaft 156. Further, by selectively engaging various combinations of selective couplers 154, multi-speed planetary transmission 150 is able to vary a speed ratio of output shaft 156 relative to input shaft 108 for a plurality of forward gears or speed ratios (input shaft 108 and output shaft 156 both rotating in the same direction) and at least one reverse gear or speed ratio (input shaft 108 and output shaft 156 rotating in opposite directions). The changing or shifting between the various gears of multi-speed planetary transmission 150 is accomplished by selectively controlling the respective engagement and disengagement of selective couplers 154 via control of fluid pressure within the number of fluid paths $140_1$-$140_N$.

Output shaft 156 of multi-speed automatic transmission 104 is coupled to or integral with a drive shaft 160. Output shaft 156 drives a rotation of drive shaft 160. Drive shaft 160 is coupled to a rear drive unit 162, such as a differential. Rear drive unit 162 is coupled to, and rotatably drives, axles 162A and 162B which in turn drive wheels 164A and 164I.

Returning to FIG. 1, vehicular system 100 further includes a transmission control circuit 200. In the illustrated embodiment, transmission control circuit 200 is microprocessor-based and includes a non-transitory computer-readable medium 202, which includes processing instructions stored therein that are executable by the microprocessor of transmission control circuit 200 to control operation of torque converter 110 and of multi-speed automatic transmission 104. A non-transitory computer-readable medium 202, or memory, may include random access memory (RAM), read-only memory (ROM), erasable programmable read-only memory (e.g., EPROM, EEPROM, or Flash memory), or any other tangible medium capable of storing information.

For example, transmission control circuit 200 may execute a shift criteria logic 400 which provides control signals to electro-hydraulic system 138 over control lines $206_1$-$206_N$ to achieve various configurations of multi-speed automatic transmission 104 which results in respective forward speed or gear ratios. In the case of multi-speed planetary transmission 150, shift logic 400 may selectively engage and disengage various ones of selective couplers 154 resulting in multi-speed planetary transmission 150 shifting between various gear or speed ratios of planetary gearsets 152. The term "logic" as used herein includes software and/or firmware executing on one or more programmable processors, application-specific integrated circuits, field-programmable gate arrays, digital signal processors, hard-wired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which transmission control circuit 200 is not microprocessor-based, but rather is configured to control operation of the torque converter 110 and/or multi-speed automatic transmission 104 based on one or more sets of hardwired instructions and/or software instructions stored in the non-transitory computer-readable medium 202, or memory. Further, transmission control circuit 200 may be contained within a single device or be a plurality of devices networked together to provide the functionality described herein.

Transmission control circuit 200 receives multiple inputs that may be used by shift criteria logic 400 to determine whether to shift between various gears of multi-speed automatic transmission 104, such as various gears of planetary gearsets 152 of multi-speed planetary transmission 150 in the illustrated embodiment. Referring to FIG. 1, vehicular system 100 includes a number of sensors associated with one of multi-speed automatic transmission 104 and torque converter 110 and configured to produce indications of one or more operating states of multi-speed automatic transmission 104 and torque converter 110, respectively. The sensors may either actively provide an indication by sending a sensor signal or passively provide an indication by making available a monitored characteristic, such as a voltage, a temperature, a pressure or other suitable characteristics. Sensors are one type of operational characteristic monitoring devices.

For example, torque converter 110 illustratively includes a conventional speed sensor 142 that is positioned to provide an indication of a rotational speed of input shaft 112 which also corresponds to the rotational speed of output shaft 106 of prime mover 102. Speed sensor 142 is electrically connected to a pump speed input, PS, of transmission control circuit 200 via a signal path 144. Transmission control circuit 200 processes the indication of the rotational speed of input shaft 112 in a conventional manner to determine the rotational speed of input shaft 112 of torque converter 110 and hence of output shaft 106 of prime mover 102.

In a similar fashion, multi-speed automatic transmission 104 includes a first conventional speed sensor 146 that is positioned to provide an indication of a rotational speed of input shaft 108 which is the same as a rotational speed of turbine shaft 118 of torque converter 110 and a second conventional speed sensor 170 that is positioned to provide an indication of a rotational speed of output shaft 156. Speed sensor 146 is electrically connected to a transmission input shaft speed input, TIS, of transmission control circuit 200 via a signal path 148. Transmission control circuit 200 processes the indication of the rotational speed of input shaft 108 in a conventional manner to determine the rotational speed of input shaft 108 or turbine shaft 118. Speed sensor 170 is electrically connected to a transmission output shaft speed input, TOS, of transmission control circuit 200 via a signal path 172. Transmission control circuit 200 processes the indication of the rotational speed of output shaft 156 in a conventional manner to determine the rotational speed of output shaft 156.

In the illustrated embodiment, vehicular system 100 further includes a prime mover control circuit 174 having an input/output port (I/O) that is electrically coupled to prime mover 102 via a number of signal paths 176, illustratively one. Prime mover control circuit 174 may be conventional, and is operable to control and manage the overall operation of prime mover 102. Prime mover 102 may include a speed retarding device which reduces the speed of prime mover 102. Exemplary speed retarding devices include an engine brake (EB) 178, an exhaust brake, or other suitable speed-retarding devices. Prime mover control circuit 174 may be electrically and operably coupled to the speed-retarding device (EB) 178 via signal paths 176 to control the speed of prime mover 102.

Prime mover control circuit 174 also includes a communication port, COM, which is electrically connected to a similar communication port, COM, of transmission control circuit 200 via one or more signal paths 180. The one or more signal paths 180 are typically referred to collectively as a data link. Transmission control circuit 200 and prime mover control circuit 174 are operable to exchange information via the one or more signal paths 180 in a conventional manner. In one embodiment, for example, transmission control circuit 200 and prime mover control circuit 174 are operable to exchange information via the one or more signal paths 180 in the form of one or more messages in accordance with a society of automotive engineers (SAE) J-1939 communications protocol, although this disclosure contemplates other embodiments in which transmission control circuit 200 and prime mover control circuit 174 are operable to exchange information via the one or more signal paths 180 in accordance with one or more other conventional communication protocols.

Referring still to FIG. 1, vehicular system 100 also includes an inclination sensor. An exemplary inclination sensor is an accelerometer 204 supported by vehicular system 100. As illustrated in FIG. 1, accelerometer 204 is supported by electro-hydraulic system 138 of multi-speed automatic transmission 104. Alternatively, the accelerometer 204 may be internally disposed within transmission control circuit 200, internally disposed within prime mover control circuit 174, supported by multi-speed automatic transmission 104, supported by prime mover 102, or another component of vehicular system 100. In any event, accelerometer 204 may continuously measure road grade and communicate the measurement to transmission control circuit 200. Additional details regarding the measurement of road grade are provided in US Published Patent Application No. 2014/0336890, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein.

The illustrative vehicular system 100 of FIG. 1 also includes a location determiner 210 which provides a current location of vehicular system 100, such as longitudinal and latitudinal coordinates. Exemplary location determiners include GPS receivers which, based on signals with orbiting satellites, determine a location of vehicular system 100 and other suitable devices for determining a location of vehicular system 100. Transmission control circuit 200 either has stored a map of road grade values for various locations or includes a communication device, such as a cellular transceiver, that retrieves road grade information from a remote computing device. In one example, location determiner 210 provides an indication of the current location of vehicular system 100 to transmission control circuit 200 through signal line 212. In another example, location determiner 210 provides an indication of the current location of vehicular system 100 through a wireless connection to transmission control circuit 200. In a further example, location determiner 210 provides an indication of the current location of vehicular system 100 to transmission control circuit 200 from prime mover control circuit 174 through signal paths 180.

The illustrative vehicular system 100 of FIG. 1 also includes an object detector 220. Exemplary object detectors include radar devices, ultrasonic transceivers, cameras, and other suitable devices for monitoring the space adjacent to vehicular system 100. In one example, object detector 220 provides an indication of a detection of an object within a specified envelope of vehicular system 100 or a distance value to a detected object to transmission control circuit 200 through signal line 222. In another example, object detector 220 provides an indication of a detection of an object within a specified envelope of vehicular system 100 or a distance value to a detected object through a wireless connection to transmission control circuit 200. In a further example, object detector 220 provides an indication of a detection of an object within a specified envelope of vehicular system 100 or a distance value to a detected object to transmission control circuit 200 from prime mover control circuit 174 through signal paths 180.

The illustrative vehicular system 100 of FIG. 1 also includes a load sensor 230. In one embodiment, load sensor 230 is supported by vehicular system 100 to measure a mass or weight of portions of vehicular system 100, such as cargo carrying portions. Load sensor 230 may communicate with transmission control circuit 200 through signal line 232 and with prime mover control circuit 174 through signal paths 180.

Referring still to FIG. 1, vehicular system 100 further includes an operator interface 300 positioned in an operator space of the vehicle (e.g., an operator cab). As explained in more detail herein, operator interface 300 includes a plurality of operator inputs that may be actuated or otherwise activated by an operator of the vehicle. The operator inputs are an exemplary type of operational characteristic monitoring devices. Each of the operator inputs of operator interface 300 provide an operator interface input characteristic to one or both of transmission control circuit 200 and prime mover control circuit 174.

Operator interface 300 includes a throttle control input 302 and a corresponding throttle control sensor (TCS) 182 which is in electrical communication with throttle control input 302. Throttle control input 302 may be an accelerator pedal actuatable by a foot of the operator, and throttle control sensor 182 monitors a position of the accelerator pedal. Throttle control input 302 may be other types of actuatable devices including finger triggers, throttle levers, and other suitable devices that may be actuated. As throttle control input 302 is actuated or triggered, the position of throttle control input 302 may be communicated to or measured by throttle control sensor 182. In turn, throttle control sensor 182 may send a corresponding signal along a signal path 184 through signal paths 180 to one or both of prime mover control circuit 174 and transmission control circuit 200. In one example, transmission control circuit 200 monitors whether throttle control input 302 is actuated or not. In another embodiment, transmission control circuit 200 monitors a percentage amount that throttle control input 302 has been actuated. As is known, in the case of an internal combustion engine, depressing the foot pedal results in prime mover control circuit 174 providing more fuel to the engine.

Operator interface 300 may include further operator inputs. For example, operator interface 300 includes a service brake input 304. Vehicular system 100 includes a service brake 186 that is operably coupled to axles 162A and 162B to control the speed of wheels 164A, 164B, respectively. Exemplary service brake input 304 includes a brake pedal, a brake lever, or other mechanism accessible by the operator to control the operation of the service brake 186. An operator may actuate or otherwise engage service brake 186 by actuating service brake input 304. In the illustrated embodiment, service brake 186 is controlled by a brake controller (BC) 188 which receives an input from service brake input 304 and controls the operation of service brake 186 through control line 190. In one example, control line 190 is a hydraulic line and brake controller 188 provides sufficient hydraulic pressure to actuate service brake 186 to slow wheels 164A and 164B. Further, brake controller 188 is illustratively shown as being in communication with one or both of transmission control circuit 200 and prime mover control circuit 174 through signal paths 191 and 180. In one example, brake controller 188 monitors whether the foot pedal is actuated or not. In another example, brake controller 188 monitors a percentage amount that the foot pedal is depressed. As is known, a depression of the service brake input 304 results in brake controller 188 actuating service brake 186 to slow vehicular system 100.

Operator interface 300 further includes an engine speed retarding input, illustratively an engine braking input 306. Engine braking input 306 is operatively coupled to prime mover control circuit 174 over signal paths 192. Exemplary engine braking inputs include switches, buttons, dials, and other suitable input members provided on a dash of vehicular system 100. An operator of vehicular system 100 may actuate the button or switch to request engine braking. Prime mover control circuit 174 monitors the state of engine braking input 306 (actuated or not) or otherwise receives an indication of the state of engine braking input 306 and sets a configuration of engine brake or other suitable engine retarder 178 accordingly. In one example, the request for engine braking is denied unless throttle control input 302 is greater than zero.

Operator interface 300 further includes a cruise control input 308. Cruise control input 308 is operatively coupled to prime mover control circuit 174 over signal paths 194. Exemplary cruise control inputs include switches, buttons, dials, and other suitable input members provided on a dash of vehicular system 100 or a steering wheel of vehicular system 100. An operator of vehicular system 100 may actuate the button or switch to request that prime mover control circuit 174 and transmission control circuit 200 maintain a current speed of vehicular system 100 without constant depression of throttle control input 302, for example. Prime mover control circuit 174 monitors the state of cruise control input 308 (actuated or not) or otherwise receives an indication of the state of cruise control input 308 and sets a configuration of prime mover 102 accordingly. In one embodiment, prime mover control circuit 174 configures prime mover 102 to operate to maintain a generally constant ground speed.

Operator interface 300 further includes a transmission shift selector 310. Transmission shift selector 310 is operatively coupled to transmission control circuit 200 over one or more signal paths 196. Transmission shift selector 310 provides the operator with a plurality of inputs through which the operator may communicate a desired gear setting to transmission control circuit 200. For example, an operator may request the multi-speed automatic transmission 104 be placed in a forward gear, a reverse gear, or a neutral configuration. Further, transmission shift selector 310 may provide the operator with inputs to select a desired forward gear or speed ratio. Transmission control circuit 200 monitors the state of transmission shift selector 310 or otherwise receives an indication of the state of transmission shift selector 310 and sets a configuration of multi-speed automatic transmission 104 accordingly.

Figure 4B:
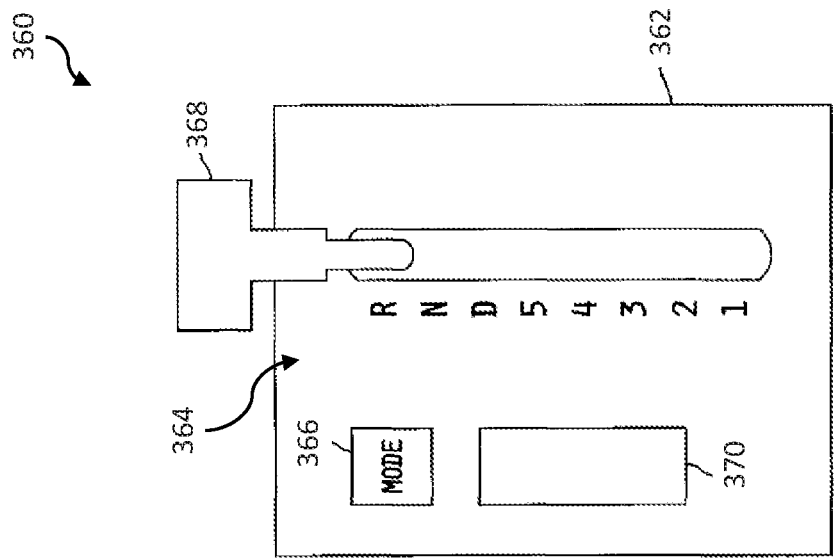
FIG. 4B illustrates a second exemplary transmission shift selector of the powered vehicular system of FIG. 1.
Figure 4A:
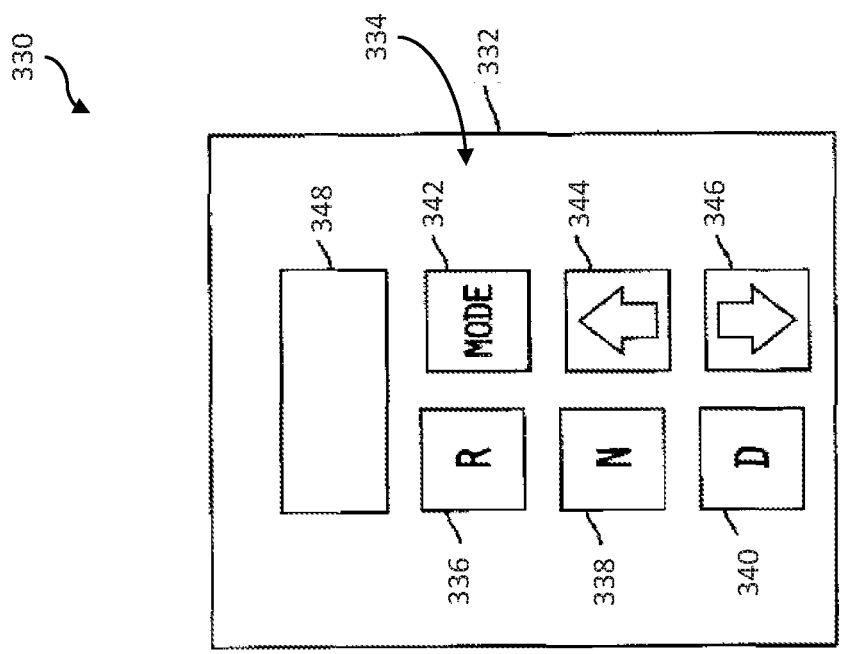
FIG. 4A illustrates a first exemplary transmission shift selector of the powered vehicular system of FIG. 1.

Referring to FIG. 4A, a first transmission operator interface 330 is illustrated. Transmission operator interface 330 includes a housing 332 to which a plurality of operator-selectable input members 334 are mounted. Illustratively, operator-selectable input members 334 includes a plurality of touch-sensitive keys or buttons that are each disposed within a separate well mounted to or integral with housing 332. Alternatively, operator-selectable input members 334 may comprise raised or flush-mounted keys or buttons that are mounted to or integral with transmission operator interface 330. Transmission operator interface 330 further includes an indicator 348 that provides visual feedback to the operator of vehicular system 100 of the status of one or both of vehicular system 100 and multi-speed automatic transmission 104. Exemplary indicators 348 include an LED display, an LCD display, a plurality of indicator lights, or other suitable visual indicators. In one example, indicator 348 provides a visual indication of a vehicle direction of vehicular system 100, a currently selected gear ratio of multi-speed planetary transmission 150, and, if applicable, one or more fault codes.

Operator-selectable input members 334 includes a reverse (R) key or button input 336, a neutral (N) key or button input 338, a forward (D) key or button input 340, a mode (MODE) key or button input 342, a manual shift up (↑) key or button input 344, and a manual shift down (↓) key or button input 346. Transmission control circuit 200 is responsive to user selection of (R) button input 336 to configure multi-speed automatic transmission 104 to operate in a reverse gear. Transmission control circuit 200 is responsive to user selection of (N) button input 338 to configure multi-speed automatic transmission 104 to operate in a neutral state wherein neither a forward or a reverse gear is engaged. Transmission control circuit 200 is responsive to user selection of (D) button input 340 to configure multi-speed automatic transmission 104 to operate in a forward gear.

Figure 3B:
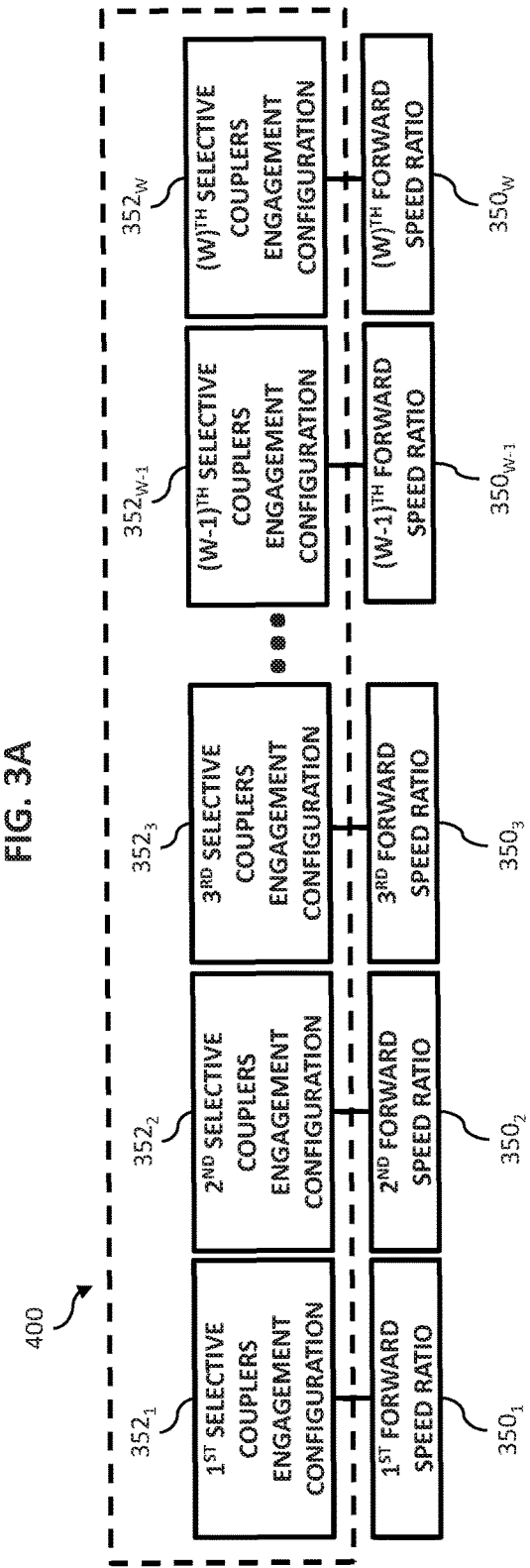
FIG. 3B illustrates a representative view of a plurality of forward speed ratios of the planetary gear transmission of FIG. 3A and the corresponding selective coupler configurations provided in a shift logic of a transmission control circuit of the powered vehicular system of FIG. 1.

Referring to FIG. 3B, shift criteria logic 400 may configure planetary gearsets 152 of multi-speed planetary transmission 150 in a number (W) of forward gears or speed ratios $350_1$-$350_W$, wherein W is a positive integer with a value at least equal to two. In one embodiment, W is equal to or greater than six. In another embodiment, W is equal to or greater than nine. Each of forward gears $350_1$-$350_W$ are established based on respective engagement configurations, $352_1$-$352_W$, of selective couplers 154 of multi-speed planetary transmission 150. Exemplary architectures for multi-speed planetary transmission 150 are disclosed in US Published Patent Application No. 2016/0116025, filed Oct. 21, 2015, titled MULTI-SPEED TRANSMISSION; US Published Patent Application No. 2016/0116026, filed Oct. 22, 2015, titled. MULTI-SPEED TRANSMISSION; US Published Patent Application No. 2016/0116027, filed Oct. 22, 2015, titled MULTI-SPEED TRANSMISSION; US Published Patent Application No. 2016/0116028, filed Oct. 22, 2015, titled MULTI-SPEED TRANSMISSION; US Published Patent Application No. 2016/0116029, filed Oct. 22, 2015, titled MULTI-SPEED TRANSMISSION; US Published Patent Application No. 2016/0138680, filed Jan. 21, 2016, titled MULTI-SPEED TRANSMISSION; US Published Patent Application No. 2016/0138681, filed Jan. 21, 2016, titled MULTI-SPEED TRANSMISSION; US Published Patent Application No. 2016/0138682, filed Jan. 21, 2016, titled MULTI-SPEED TRANSMISSION; US Published Patent Application No. 2016/0040754, filed Aug. 7, 2014, titled MULTI-SPEED TRANSMISSION; and US Published Patent Application No. 2016/0047440, filed Aug. 12, 2014, titled MULTI-SPEED TRANSMISSION, the entire disclosures of which are expressly incorporated by reference herein.

Shift criteria logic 400 of transmission control circuit 200 selects which one of forward gears $250_1$-$250_L$ ($350_1$-$350_W$ for multi-speed planetary transmission 150) to be established and when to switch between forward gears $250_1$-$250_L$ ($350_1$-$350_W$ for multi-speed planetary transmission 150) based on various inputs and desired operation of vehicular system 100. For example, shift criteria logic 400 may include control logic that determines to shift between the various forward gears $250_1$-$250_L$ ($350_1$-$350_W$ for multi-speed planetary transmission 150) based on desired performance characteristics for vehicular system 100. Exemplary performance characteristics include increasing fuel economy, decreasing wear on brake components, and other performance characteristics. Exemplary control logics are disclosed in U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES; U.S. Pat. No. 8,935,068, filed Jun. 18, 2013, titled SYSTEM AND METHOD FOR OPTIMIZING DOWNSHIFTING OF A TRANSMISSION DURING VEHICLE DECELERATION; U.S. Pat. No. 9,365,201, filed Mar. 15, 2013, titled DEVICE, SYSTEM, AND METHOD FOR CONTROLLING TRANSMISSION TORQUE TO PROVIDE HILL ASCENT AND/OR DESCENT ASSISTANCE USING ROAD GRADE; US Published Patent Application No. 2015/0292615, filed Apr. 11, 2014, titled SYSTEM AND METHOD FOR AUTOMATIC NEUTRAL AND AUTOMATIC RETURN-TO-RANGE FOR USE WITH AN AUTOMATIC TRANSMISSION; US Published Patent Application No. 2016/0025213, filed Oct. 6, 2015, titled METHOD OF SETTING TRANSMISSION SHIFT POINTS IN REAL-TIME BASED UPON AN ENGINE PERFORMANCE CURVE, the entire disclosures of which are expressly incorporated by reference herein.

Returning to FIG. 4A, transmission control circuit 200 is responsive to user selection of MODE button input 342 to configure multi-speed planetary transmission 150 to select certain operating modes of multi-speed automatic transmission 104. For instance, multi-speed automatic transmission 104 may have a secondary output shaft that is used for power take-off ("PTO") operation. The operator may select to activate the secondary output shaft through MODE button input 342. MODE button input 342 may also be used for other operations, such as clearing fault codes.

As mentioned herein, shift criteria logic 400 automatically selects between forward gears $250_1$-$250_W$ ($350_1$-$350_W$ for multi-speed planetary transmission 150) based on various inputs and further based on various performance characteristics of vehicular system 100. There are instances wherein an operator of vehicular system 100 may desire to elect a different forward gear $250_1$-$250_L$ ($350_1$-$350_W$ for multi-speed planetary transmission 150) than the current forward gear $250_1$-$250_L$ ($350_1$-$350_W$ for multi-speed planetary transmission 150) selected by shift criteria logic 400. As shown in FIG. 4A and mentioned herein, transmission operator interface 330 includes manual shift up (↑) input 344 and manual shift down (↓) input 346. Transmission control circuit 200 is responsive to user selection of manual shift up (↑) input 344 to configure multi-speed automatic transmission 104, illustratively multi-speed planetary transmission 150, to select the next higher forward gear of multi-speed automatic transmission 104 than the one currently established. For instance, if multi-speed automatic transmission 104 is operating in third gear, the selection of manual shift up (↑) input 344 would cause shift criteria logic 400 of transmission control circuit 200 to configure multi-speed automatic transmission 104 to operate in fourth gear, configure selective couplers 154 for the illustrated multi-speed planetary transmission 150. In a similar fashion, transmission control circuit 200 is responsive to user selection of manual shift down (↓) input 346 to configure multi-speed automatic transmission 104 to select the next lower forward gear of multi-speed automatic transmission 104 than the one currently established. For instance, if multi-speed automatic transmission 104 is operating in third gear, the selection of manual shift down (↓) input 346 would cause shift criteria logic 400 of transmission control circuit 200 to configure multi-speed automatic transmission 104 to operate in second gear, configure selective couplers 154 for the illustrated multi-speed planetary transmission 150. As explained herein, shift criteria logic 400 includes additional logic which determines when to permit shifting of gears in response to a selection of either manual shift up (↑) input 344 or manual shift down (↓) input 346 based on additional characteristics of vehicular system 100.

Referring to FIG. 4B, a second exemplary transmission operator interface 360 is illustrated. Transmission operator interface 360 includes a housing 362 to which a plurality of operator-selectable input members 364 is mounted. Illustratively, operator-selectable input members 364 includes a touch-sensitive mode (MODE) key or button input 366, like mode (MODE) key or button input 342 of transmission operator interface 330, and a shift lever 368. Transmission operator interface 360 further includes an indicator 370, like indicator 348 of transmission operator interface 330, which provides visual feedback to the operator of vehicular system 100 of the status of one or both of vehicular system 100 and multi-speed automatic transmission 104.

Shift lever 368 is manually actuatable to a plurality of different positions. Each of the plurality of different positions corresponds to a different input signal that is provided to the transmission control circuit 200. In the illustrated embodiment, housing 362 includes visual input indicators adjacent to the plurality of different positions of shift lever 368 to provided visual feedback to the operator of a current position of shift lever 368. In the embodiment illustrated in FIG. 4B, shift lever 368 is movable relative to housing 362 to any of the positions R, N, D, 5, 4, 3, 2, and 1. Placing shift lever 368 in the position corresponding to R results in transmission control circuit 200 configuring multi-speed automatic transmission 104 to operate in a reverse gear. Placing shift lever 368 in the position corresponding to N results in transmission control circuit 200 configuring multi-speed automatic transmission 104 to be placed in a neutral state wherein neither a forward nor a reverse gear is engaged. Placing shift lever 368 in the position corresponding to D results in transmission control circuit 200 configuring multi-speed automatic transmission 104 operate in a forward gear. Placing shift lever 368 in one of the positions corresponding to numbers 1-5 results in transmission control circuit 200 configuring multi-speed automatic transmission 104 to operate in the corresponding forward gear. For example, in the illustrated embodiment, placing shift lever 368 in the position corresponding to "1" results in transmission control circuit 200 configuring selective couplers 154 of multi-speed planetary transmission 150 to place multi-speed planetary transmission 150 in first gear.

Returning to FIG. 1, transmission control circuit 200 may communicate with one or more operational characteristic monitors or sensors to determine one or more operational characteristics of vehicular system 100. By monitoring, the operational characteristic monitor may sense a value indicative of a parameter or determine a parameter based on one or more sensed values and/or determined values. Exemplary monitors or sensors disclosed in the illustrated embodiment of FIG. 1 include speed sensors 142, 146, 170, throttle control sensor 182, brake controller 188, inclination sensor 204, location determiner 210, object detector 220, and load sensor 230, for example.

In one embodiment, a vehicle related speed is determined using one or more of the speed sensors 142, 146, 170. In another embodiment, the vehicle related speed is determined by monitoring a rotational speed of a countershaft of multi-speed automatic transmission 104 or another component whose speed is proportional to a speed of vehicular system 100. In yet another embodiment, the vehicle related speed is determined based on spaced-apart readings from location determiner 210 over time. In addition to vehicle speed, vehicle related acceleration or deceleration may be determined by monitoring changes in vehicle related speed over time.

In one embodiment, an engine load is determined using one or more of the speed sensors 142, 146, 170 or is communicated by prime mover control circuit 174. In one embodiment, the engine load is a measure of the torque of prime mover 102. In another embodiment, the engine load is a measure of the horsepower of prime mover 102. The engine load provides an indication of the demand on prime mover 102. In one embodiment, the engine load is estimated based on a rate that fuel is provided to prime mover 102 in the case of an internal combustion engine. A higher fuel rate may indicate acceleration of vehicular system 100 or operation of vehicular system 100 at higher revolutions per minute while a lower fuel rate may indicate deceleration of vehicular system 100 or operation of vehicular system 100 at lower revolutions per minute. The monitoring of engine load may be beneficial for situations wherein throttle control input 302 may not be actuated, but prime mover 102 is not idling. For instance, if cruise control input 308 is actuated, throttle control input 302 is not actuated and prime mover 102 is running at higher than idle to propel vehicular system 100.

In one embodiment, a vehicle load characteristic is vehicle mass and is determined using load sensor 230. In another embodiment, vehicle mass is estimated at least based on engine torque and vehicle speed as disclosed in U.S. Pat. No. 7,499,784, filed Apr. 9, 2007, titled METHOD OF SELECTING A TRANSMISSION SHIFT SCHEDULE and U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES, the entire disclosures of which are expressly incorporated by reference herein. In another embodiment, the vehicle load characteristic is vehicle length. For example, transmission control circuit 200 may store an expected baseline mass for vehicular system 100. If the determined vehicle mass is above the baseline, transmission control circuit 200 may infer that a trailer has been attached to vehicular system 100. In an alternative embodiment, vehicular system 100 includes a sensor that detects the coupling of a trailer to vehicular system 100. The presence or absence of a trailer provides an indication of a length of vehicular system 100.

Referring still to FIG. 1, a Vehicle Electronic Programming Station ("VEPS") 460 is shown in communication with transmission control circuit 200. Transmission control circuit 200 may receive one or more threshold parameters from VEPS 460. In this manner, a fleet owner may input certain threshold parameters to control the operation of vehicular system 100. VEPS 460 may provide additional information to transmission control circuit 200 as well, such as shift schedules and other parameters. Additional details regarding VEPS 460 are provided in U.S. Pat. No. 8,935,068, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein.

In certain situations, such as when climbing a steep and/or long hill, vehicular system 100 may lack sufficient power to make use of all the forward gears $250_1$-$250_L$ ($350_1$-$350_W$ for multi-speed planetary transmission 150). If multi-speed automatic transmission 104 continues to operate in its current gear (e.g., $2^{nd}$ gear $350_2$ of FIG. 3B), prime mover 102 may run at maximum speed, which consumes excess fuel. On the other hand, if multi-speed automatic transmission 104 upshifts to a higher gear (e.g., $3^{rd}$ gear $350_3$ of FIG. 3B), prime mover 102 may lack sufficient power to adequately hold the grade, which causes deceleration and driver annoyance.

Transmission control circuit 200 may be configured to detect and respond to a hill climb event based on desired performance characteristics for vehicular system 100. Exemplary performance characteristics include fuel economy, speed, acceleration, and other performance characteristics. As described further below in exemplary embodiments, a hill climb event occurs when vehicular system 100 would accelerate or maintain speed in a climb gear (e.g., $2^{nd}$ gear $350_2$ of FIG. 3B) but decelerate in the next upshift gear (e.g., $3^{rd}$ gear $350_3$ of FIG. 3B).

Figure 5:
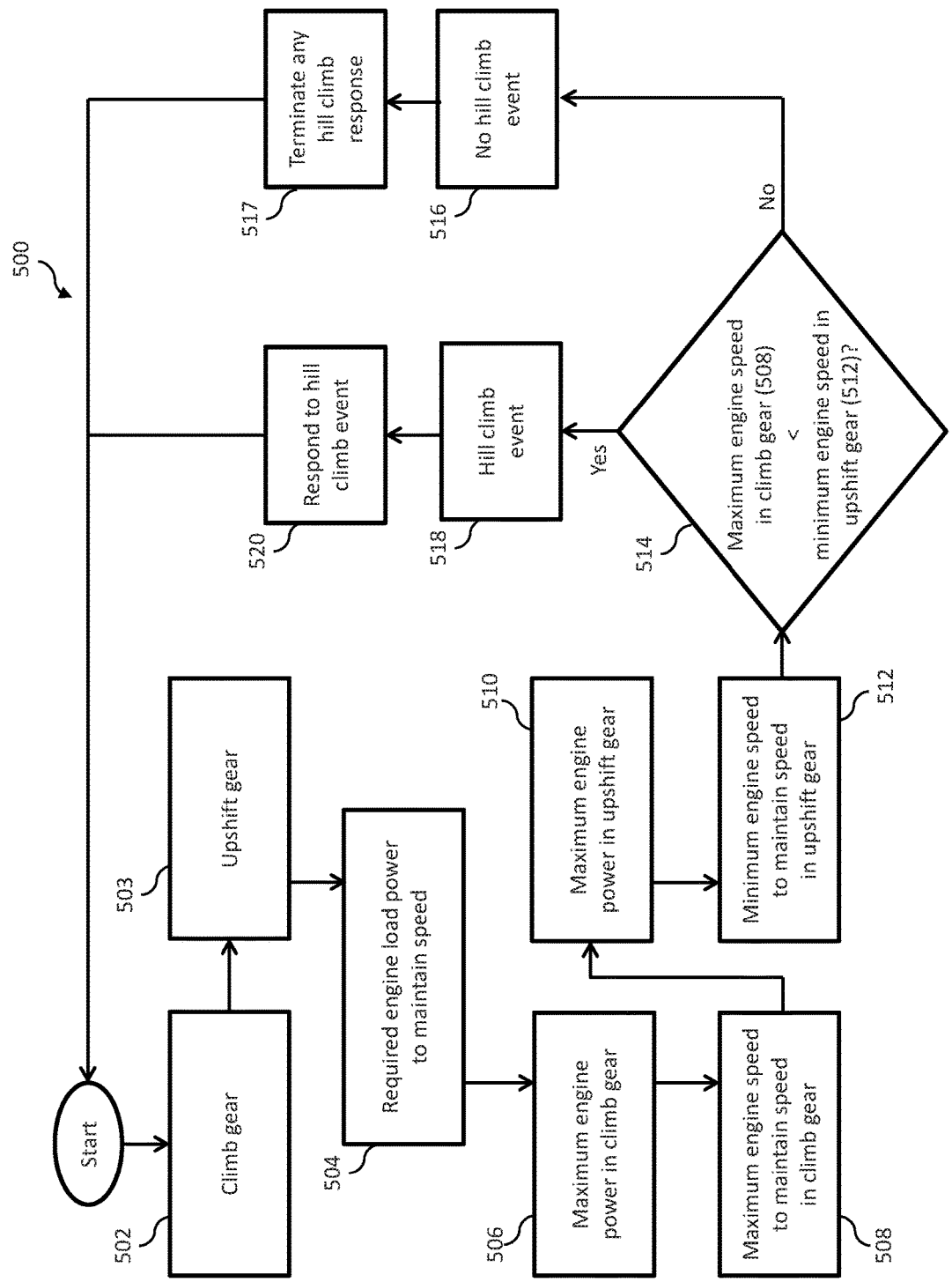
FIG. 5 illustrates an exemplary processing sequence for the transmission control circuit of the powered vehicular system of FIG. 1 to detect and respond to a hill climb event.

FIG. 5 illustrates an exemplary processing sequence 500 for transmission control circuit 200 to detect and respond to the hill climb event. Sequence 500 may be repeated to respond to changing road grade conditions. In one embodiment, sequence 500 may be performed continuously during operation of vehicular system 100. In other embodiment, sequence 500 may be performed when a road grade measurement from accelerometer 204 exceeds a certain road grade threshold.

At block 502, transmission control circuit 200 establishes the climb gear (e.g., $2^{nd}$ gear $350_2$ of FIG. 3B). The climb gear should be sufficient to accelerate or at least maintain vehicle speed up the hill. In practice, transmission control circuit 200 will usually identify the current gear as the climb gear. However, if the current gear lacks adequate acceleration capability and/or engine speed, then transmission control circuit 200 may identify the next downshift gear as the climb gear.

Once the climb gear is established at block 502, sequence 500 continues to block 503, where transmission control circuit 200 identifies the next highest gear as the upshift gear (e.g., $3^{rd}$ gear $350_3$ of FIG. 3B).

At block 504, transmission control circuit 200 determines the engine load power that is required to maintain vehicle speed up the hill with zero acceleration as a function of engine speed. The required engine load power may also be expressed as a function of transmission output speed, because transmission output speed equals engine speed divided by the gear ratio. The required engine load power would be sufficient to counteract all competing power losses from vehicular system 100. Thus, the required engine load power may be determined by adding together all power losses from prime mover 102 to wheels 164A and 164B, including power losses from accessories mounted to prime mover 102 (e.g., fan, air compressor, alternator, power steering pump), power losses in multi-speed automatic transmission 104, power losses in axles 162A and 162B, and power losses at wheels 164A and 164B due to aerodynamic drag, tire rolling resistance, and grade, for example. In one embodiment, certain power losses may be calculated by comparing the engine speed measured by speed sensor 142 to the transmission output speed measured by speed sensor 170. Also, certain power losses may be stored in the non-transitory computer-readable medium 202, or memory, of transmission control circuit 200 or in a similar memory of prime mover control circuit 174, for example.

At block 506, transmission control circuit 200 determines the maximum engine power in the climb gear as a function of engine speed. As noted above, the maximum engine power in the climb gear may also be expressed as a function of transmission output speed. In one embodiment, the maximum engine power may be published by the supplier of prime mover 102 and stored in the non-transitory computer-readable medium 202, or memory, of transmission control circuit 200 or in a similar memory of prime mover control circuit 174, for example. In other embodiments, the maximum engine power may be calculated by prime mover control circuit 174 based on vehicle acceleration or other suitable parameters.

At block 508, transmission control circuit 200 identifies the maximum engine speed or transmission output speed where the maximum engine power in the climb gear (from block 506) equals the required engine load power (from block 504). In other words, transmission control circuit 200 identifies the maximum engine speed or transmission output speed (generally, the "maximum speed") in the climb gear that would maintain vehicle speed up the hill with zero acceleration.

Figure 6:
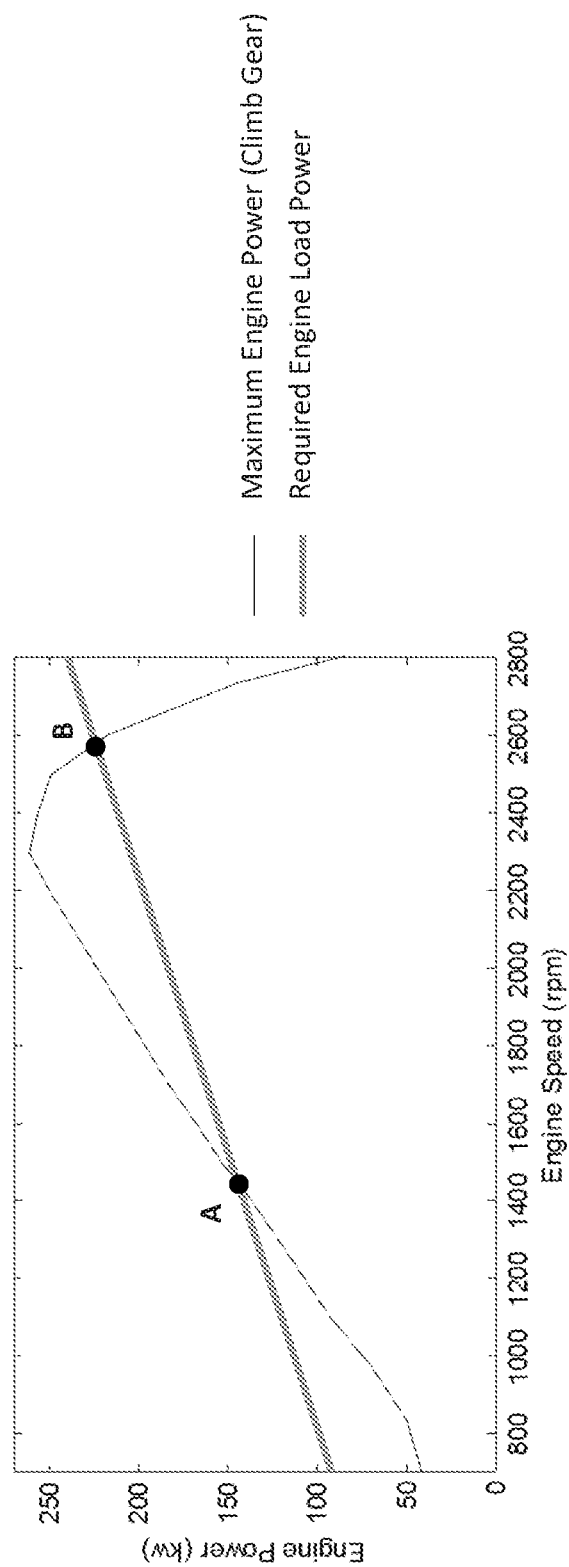
FIG. 6 illustrates a first exemplary graph of engine power versus engine speed, including an engine power curve for a climb gear and a required engine power to maintain a vehicle speed up a relatively gentle hill.

One example of this process is represented graphically in FIG. 6, which shows the required engine load power (from block 504) and the maximum engine power in the climb gear (from block 506) versus engine speed. In this example, the climb gear has a gear ratio of 1, and the parameters intersect at a minimum point A and a maximum point B. The minimum point A corresponds to the minimum engine speed in the climb gear, in this case about 1,400 rpm, which would maintain vehicle speed up the hill with zero acceleration. The corresponding minimum transmission output speed would be about 1,400 rpm divided by 1, or about 1,400 rpm. The maximum point B corresponds to the maximum engine speed in the climb gear, in this case about 2,600 rpm, which would maintain vehicle speed up the hill with zero acceleration. The corresponding maximum transmission output speed would be about 2,600 rpm divided by 1, or about 2,600 rpm. Thus, the maximum point B corresponds to the "maximum speed" output from block 508. At engine speeds below the minimum point A, vehicular system 100 would decelerate up the hill, because the maximum engine power is less than the required engine power. At engine speeds between the minimum point A and the maximum point B, vehicular system 100 would accelerate up the hill, because the maximum engine power is greater than the required engine power. Thus, the operating range from the minimum point A to the maximum point B may be referred to herein as a non-negative acceleration range. At engine speeds above the maximum point B, vehicular system 100 would decelerate up the hill, because the maximum engine power is less than the required engine power.

Returning to FIG. 5, at block 510, transmission control circuit 200 determines the maximum engine power in the upshift gear as a function of engine speed. As noted above, the maximum engine power in the upshift gear may also be expressed as a function of transmission output speed. Block 510 may be similar to block 506, except that block 510 corresponds to the upshift gear, whereas block 506 corresponds to the climb gear.

At block 512, transmission control circuit 200 identifies the minimum engine speed or transmission output speed where the maximum engine power in the upshift gear (from block 510) equals the required engine load power (from block 504). In other words, transmission control circuit 200 identifies the minimum engine speed or transmission output speed (generally, the "minimum speed") in the upshift gear that would maintain vehicle speed up the hill with zero acceleration.

Figure 7:
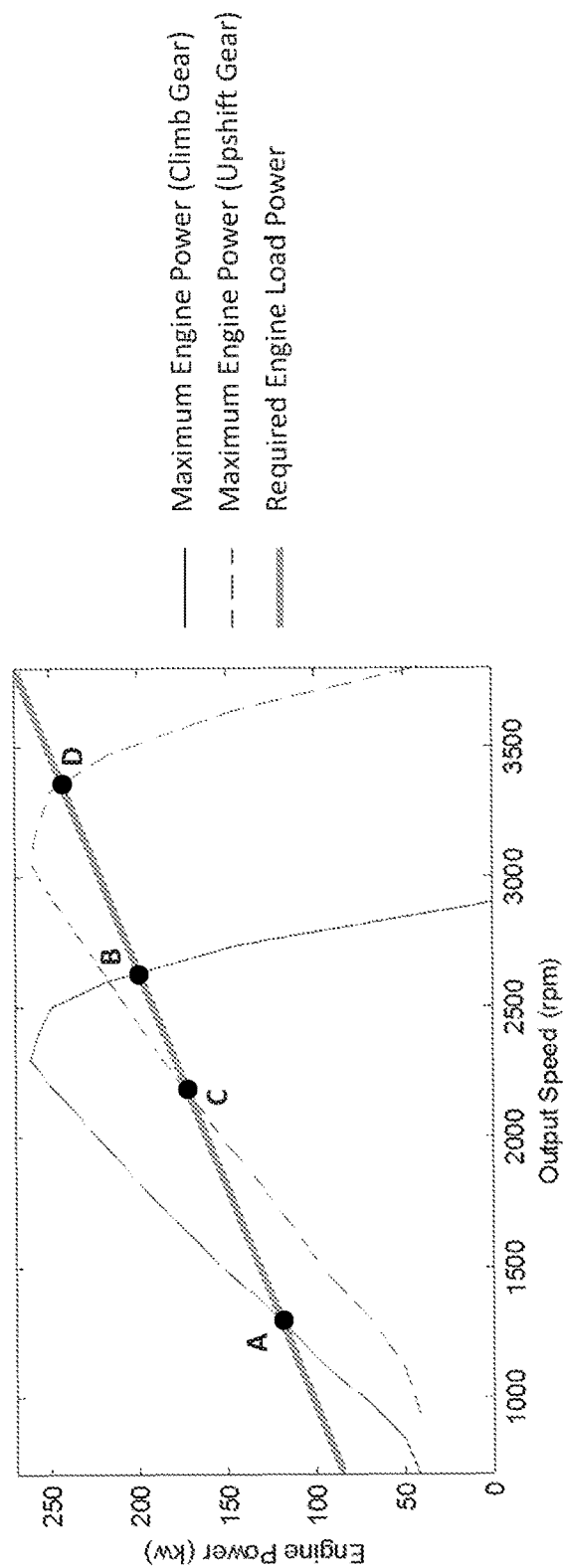
FIG. 7 illustrates a second exemplary graph similar to the first graph of FIG. 6, except that engine power is shown versus transmission output speed and also includes an engine power curve for an upshift gear.

One example of this process is represented graphically in FIG. 7, which shows the required engine load power (from block 504) and the maximum engine power in the upshift gear (from block 510) versus transmission output speed. In this example, the upshift gear has a gear ratio of 0.75, and the parameters intersect at a minimum point C and a maximum point D. The minimum point C corresponds to the minimum transmission output speed in the upshift gear, in this case about 2,200 rpm, which would maintain vehicle speed up the hill with zero acceleration. The corresponding minimum engine speed would be 0.75 multiplied by about 2,200 rpm, or about 1,650 rpm. Thus, the minimum point C corresponds to the "minimum speed" output from block 512. The maximum point D corresponds to the maximum transmission output speed in the upshift gear, in this case about 3,400 rpm, which would maintain vehicle speed up the hill with zero acceleration. The corresponding maximum engine speed would be 0.75 multiplied by about 3,400 rpm, or about 2,550 rpm. At transmission output speeds below the minimum point C, vehicular system 100 would decelerate up the hill, because the maximum engine power is less than the required engine power. At transmission output speeds between the minimum point C and the maximum point D, vehicular system 100 would accelerate up the hill, because the maximum engine power is greater than the required engine power. Thus, the operating range from the minimum point C to the maximum point D may be referred to herein as a non-negative acceleration range. At transmission output speeds above the maximum point D, vehicular system 100 would decelerate up the hill, because the maximum engine power is less than the required engine power.

Returning to FIG. 5, at block 514, transmission control circuit 200 determines whether there is a hill climb event by comparing the maximum engine speed (which may be expressed as the maximum transmission output speed) that would maintain vehicle speed in the climb gear (from block 508) with the minimum engine speed (which may be expressed as the minimum transmission output speed) that would maintain vehicle speed in the upshift gear (from block 512).

If the maximum engine speed (which may be expressed as the maximum transmission output speed) in the climb gear is greater than or equal to the minimum engine speed (which may be expressed as the minimum transmission output speed) in the upshift gear, then transmission control circuit 200 answers "No" at block 514 and identifies no hill climb event at block 516. From block 516, transmission control circuit 200 may terminate any ongoing hill climb responses at block 517 such that transmission control circuit 200 will operate in a normal state. For example, shift logic 400 of transmission control circuit 200 may permit the upshift from the climb gear to the upshift gear. From block 517, transmission control circuit 200 may return to block 502 to repeat the process and continue monitoring for a hill climb event. In the graphical example of FIG. 7, the maximum transmission output speed in the climb gear corresponding to point B is greater than the minimum transmission output speed in the upshift gear corresponding to point C, so transmission control circuit 200 would not identify the hill climb event. Stated differently, the non-negative acceleration range of the upshift gear between points C and D overlaps the non-negative acceleration range of the climb gear between points A and B. In practice, vehicular system 100 may climb the hill by shifting from point B in the climb gear to point C in the upshift gear without decelerating. This scenario may occur when the slope of the hill is relatively small.

Figure 8:
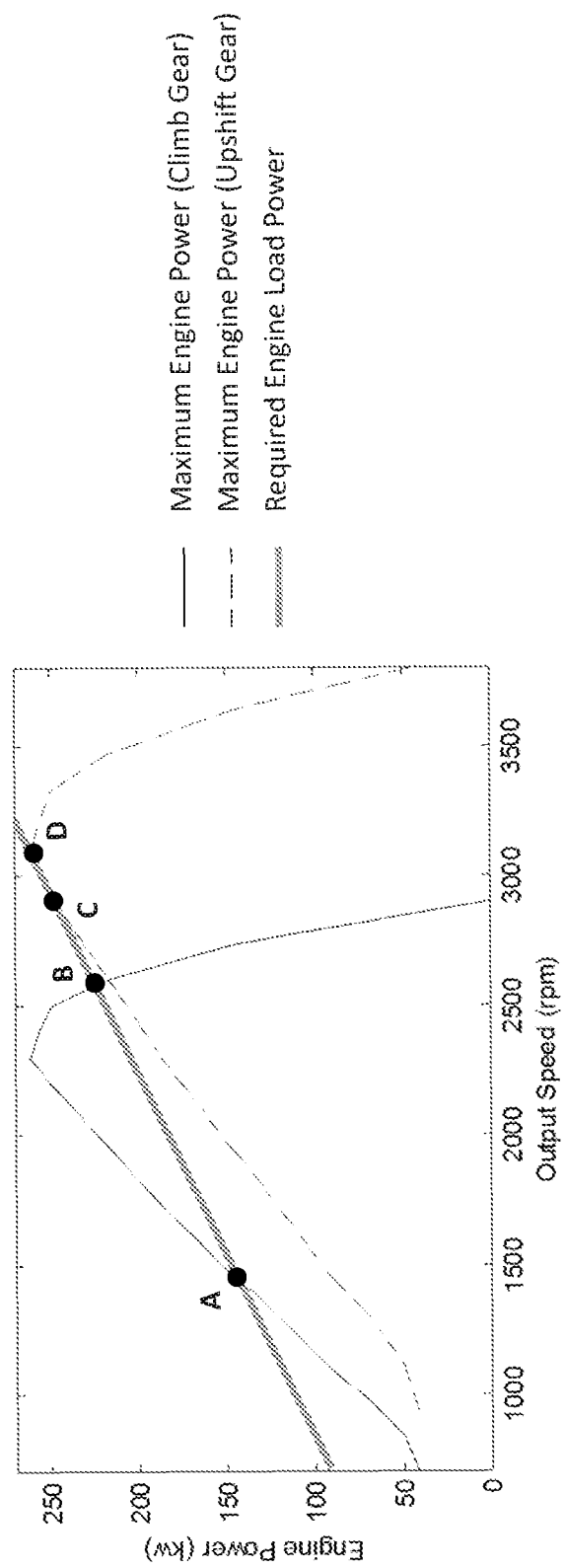
FIG. 8 illustrates a third exemplary graph similar to the second graph of FIG. 7, except that the required engine power is shown for a relatively steep hill.

On the other hand, if the maximum engine speed (which may be expressed as the maximum transmission output speed) in the climb gear is less than the minimum engine speed (which may be expressed as the minimum transmission output speed) in the upshift gear, then transmission control circuit 200 answers "Yes" at block 514 and identifies the hill climb event at block 518. In the graphical example of FIG. 8, the maximum transmission output speed in the climb gear corresponding to point B is less than the minimum transmission output speed in the upshift gear corresponding to point C, so transmission control circuit 200 would identify the hill climb event. In this scenario, the non-negative acceleration range of the upshift gear between points C and D and the non-negative acceleration range of the climb gear between points A and B are mutually exclusive. Stated differently, the non-negative acceleration range of the upshift gear between points C and D lacks any overlap with the non-negative acceleration range of the climb gear between points A and B. In practice, vehicular system 100 cannot shift from point B in the climb gear to point C in the upshift gear without decelerating. This scenario may occur when the slope of the hill is relatively large.

From block 518, the process continues to block 520 where transmission control circuit 200 responds to the hill climb event. Various responses are described below, and these responses may be performed alone or in combination. The response chosen at block 520 may be programmed into transmission control circuit 200 or selected by a user (e.g., using VEPS 460 of FIG. 1) based on desired performance characteristics for vehicular system 100, such as fuel economy, speed, acceleration, and other performance characteristics. From block 520, transmission control circuit 200 may return to block 502 to repeat the process. As noted above, the response at block 520 may continue until transmission control circuit 200 no longer identifies a hill climb event at block 516 and terminates the response at block 517.

In a first embodiment of the response at block 520, transmission control circuit 200 prevents an upshift from the climb gear to the upshift gear. Thus, multi-speed planetary transmission 150 would continue operating in the climb gear. In the graphical example of FIG. 8, prime mover 102 may operate at engine speeds between the minimum point A and the maximum point B in the climb gear without decelerating. Operating prime mover 102 at the maximum point B would sacrifice fuel economy for speed up the hill. As noted above, multi-speed planetary transmission 150 may resume normal operation when transmission control circuit 200 no longer identifies a hill climb event at block 516 and terminates the response at block 517.

In a second embodiment of the response at block 520, transmission control circuit 200 communicates with prime mover control circuit 174 and limits engine torque in order to limit engine speed. Operating prime mover 102 at the lower speed would sacrifice speed up the hill for fuel economy. Also, operating prime mover 102 at the lower speed would decrease noise. As noted above, prime mover 102 may resume normal operation when transmission control circuit 200 no longer identifies a hill climb event at block 516 and terminates the response at block 517.

In a third embodiment of the response at block 520, transmission control circuit 200 cycles multi-speed planetary transmission 150 between the climb gear and the upshift gear in a controlled manner. Although the upshift from the climb gear to the upshift gear will cause vehicular system 100 to decelerate, the decrease in speed may be acceptable and would be offset by an increase in fuel economy.

Figure 9:
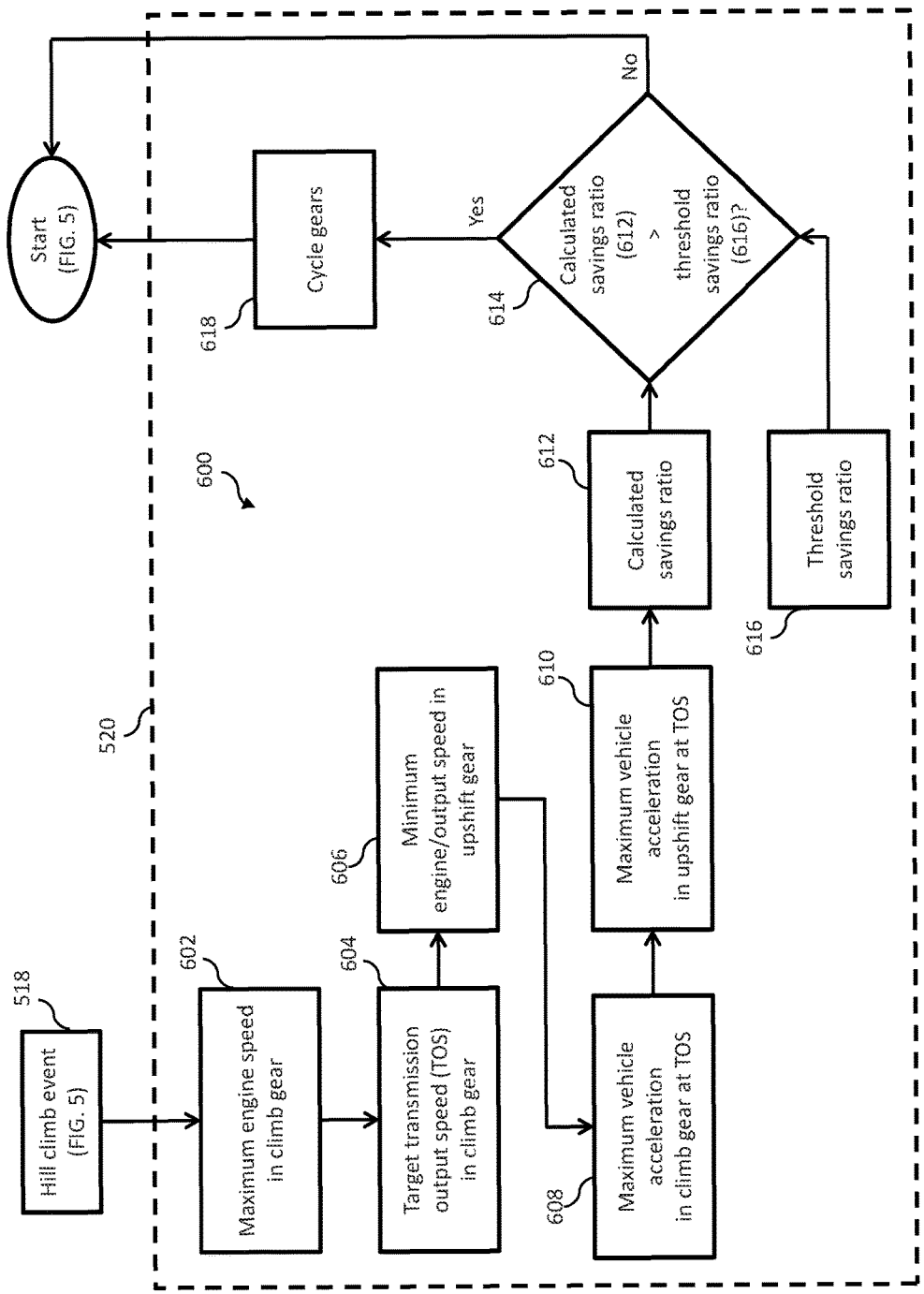
FIG. 9 illustrates an exemplary processing sequence for the transmission control circuit of the powered vehicular system to cycle the multi-speed automatic transmission of FIG. 1 in response to the hill climb event.

An exemplary processing sequence 600 for this controlled cycling is shown in FIG. 9. As noted above, sequence 600 of block 520 may terminate when transmission control circuit 200 no longer identifies a hill climb event at block 516 and terminates the response at block 517 (FIG. 5).

Figure 10:
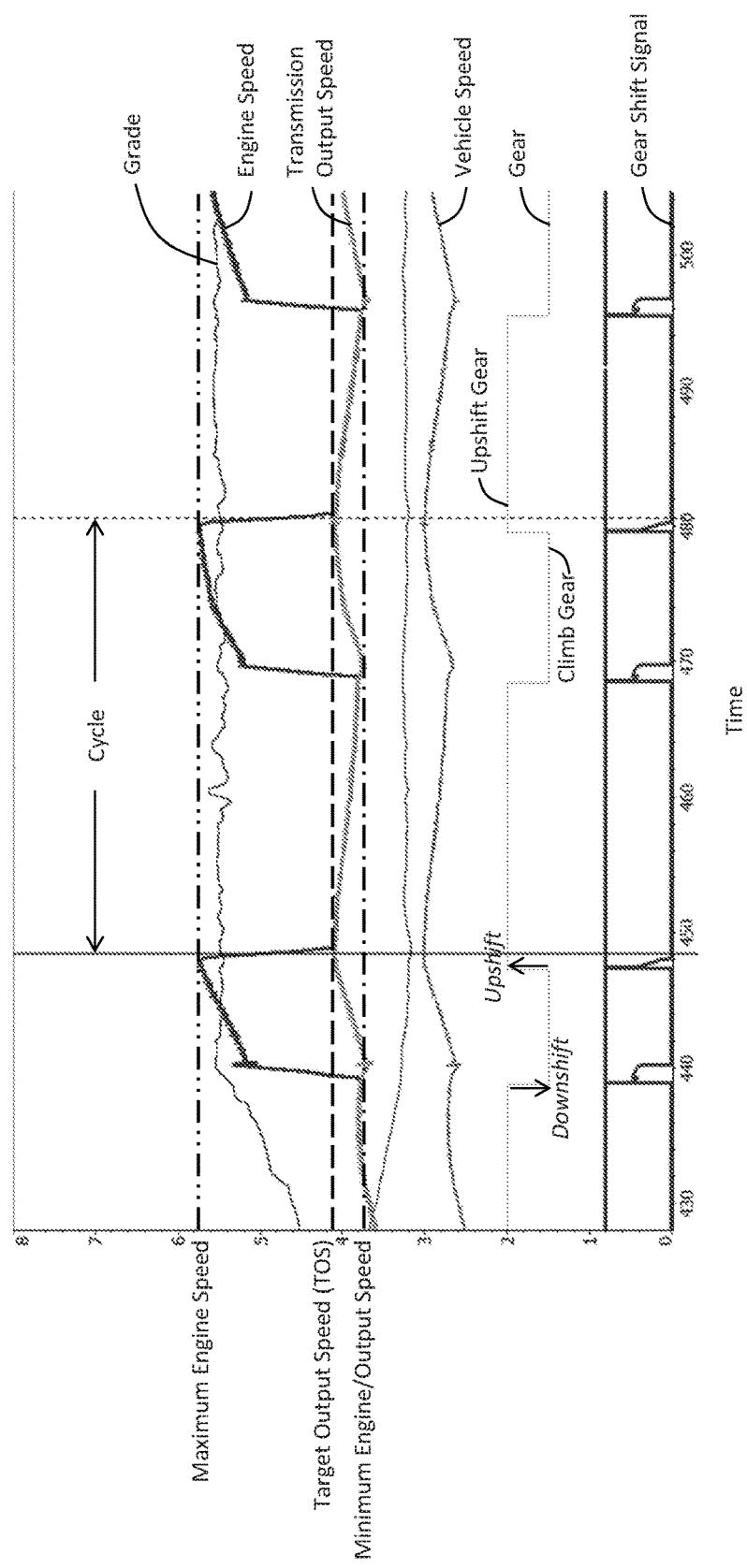
FIG. 10 illustrates an exemplary graph showing various vehicle parameters versus time in the cycling sequence of FIG. 9.

One example of sequence 600 is represented graphically in FIG. 10, which shows a plurality of vehicle parameters stacked along the y-axis versus time along the x-axis. The vehicle parameters represented in FIG. 10 include the gear shift control signal (e.g., control signals $206_1$-$206_N$ of FIG. 1), the gear or speed ratio (e.g., gears or speed ratios $350_1$-$350_W$ of FIG. 3B), the vehicle speed and the corresponding transmission output speed (e.g., from speed sensor 170 of FIG. 1), the engine speed (e.g., from speed sensor 142 of FIG. 1), and the road grade (e.g., from accelerometer 204 of FIG. 1). The numerical values displayed on the y-axis are provided for reference purposes only.

At block 602, transmission control circuit 200 identifies a maximum engine speed for the climb gear. In the graphical example of FIG. 10, the maximum engine speed is represented by a horizontal line near y=5.8. The maximum engine speed may be programmed into transmission control circuit 200 or selected by a user (e.g., using VEPS 460 of FIG. 1) based on desired performance characteristics for vehicular system 100.

At block 604, transmission control circuit 200 identifies a target transmission output speed (TOS) for the climb gear corresponding to the maximum engine speed for the climb gear (from block 602). In the graphical example of FIG. 10, the target transmission output speed is represented by a horizontal line near y=4.1.

At block 606, transmission control circuit 200 identifies a minimum engine speed and/or a minimum transmission output speed for the upshift gear. In the graphical example of FIG. 10, the minimum engine/transmission output speed is represented by a horizontal line near y=3.9. The minimum engine/transmission output speed may be programmed into transmission control circuit 200 or selected by a user (e.g., using VEPS 460 of FIG. 1) based on desired performance characteristics for vehicular system 100.

At block 608, transmission control circuit 200 determines a maximum vehicle acceleration in the climb gear at the target transmission output speed (from block 604). This parameter may be calculated according to the following formula:

$$\text{Max. Acceleration@}TOS = \text{Current Acceleration} + \frac{\text{Max. Wheel Power@}TOS - \text{Current Wheel Power}}{\text{Vehicle Speed} * \text{Vehicle Mass}}$$

In the above formula, the wheel power variables may be calculated starting from the corresponding engine power at prime mover 102 and subtracting all power losses from prime mover 102 to wheels 164A and 164B in the corresponding gear, including power losses from accessories mounted to prime mover 102 (e.g., fan, air compressor, alternator, power steering pump), power losses in multi-speed automatic transmission 104, power losses in axles 162A and 162B, and power losses at wheels 164A and 164B due to aerodynamic drag, tire rolling resistance, and grade, for example. For the maximum wheel power variable, the starting point would be the maximum engine speed at the target transmission output speed. For the current wheel power variable, the starting point would be the current engine speed. The power loss parameters used in this calculation are similar to those described above with respect to block 504 of FIG. 5.

Other variables in the above formula, including vehicle speed, current acceleration, and vehicle mass may be determined using one or more of the speed sensors 142, 146, 170, throttle control sensor 182, and load sensor 230, as described above with reference to FIG. 1.

At block 610, transmission control circuit 200 determines a maximum vehicle acceleration in the upshift gear at the target transmission output speed (from block 604). This parameter may be calculated according to the same formula as block 606, except that block 608 corresponds to the upshift gear, whereas block 606 corresponds to the climb gear.

At block 612, transmission control circuit 200 determines a savings ratio, which represents the time spent in the upshift gear over the total cycle time. The higher the savings ratio, the more time spent in the upshift gear, and the higher the fuel savings.

The savings ratio may be calculated according to the following formula:

$$\text{Savings Ratio} = \frac{\text{Time in Upshift Gear}}{\text{Total Cycle Time}} = \frac{\text{Max}(0, (E - \text{Max}(0, F)))}{\text{Max}(0.01, E - F)}$$

wherein:
E=the maximum vehicle acceleration in the climb gear at the target transmission output speed (from block 606)
F=the maximum vehicle acceleration in the upshift gear at the target transmission output speed (from block 608)

In most situations, the maximum vehicle acceleration in the climb gear (E) will be non-negative (i.e., zero or more), whereas the maximum vehicle acceleration in the upshift gear (F) will be negative. This result would be consistent with the calculation previously performed in block 514 of FIG. 5. In this situation, the formula may be expressed as:

$$\text{Savings Ratio} = \frac{E}{E - F}$$

In one example, the maximum vehicle acceleration in the climb gear (F) is about 20 m/s² and the maximum vehicle acceleration in the upshift gear (F) is about −12 m/s². Thus, the savings ratio would be about 20/(20−(−12)) or 20/32.

As the deceleration (i.e., the negative acceleration) in the upshift gear becomes more significant, the denominator of the savings ratio (i.e., the total cycle time) would increase without impacting the numerator of the savings ratio (i.e., the time spent in the upshift gear). Thus, the savings ratio would reflect a longer cycle time and a higher proportion of time spent in the climb gear rather than the upshift gear. If necessary, the denominator of the savings ratio (i.e., the total cycle time) may be increased above a predetermined minimum value (e.g., about 20 seconds) to avoid rapid cycles.

At block 614, transmission control circuit 200 compares the calculated savings ratio from block 612 to a threshold savings ratio from block 616. The threshold savings ratio may be programmed into transmission control circuit 200 or selected by a user based on desired performance characteristics for vehicular system 100. If the calculated savings ratio is greater than the threshold savings ratio, then transmission control circuit 200 answers "Yes" at block 614 and proceeds to block 618. Otherwise, transmission control circuit 200 answers "No" at block 614, exits sequence 600, and returns to sequence 500 (FIG. 5).

Transmission control circuit 200 may perform other comparisons at block 614 before proceeding to block 618. In one embodiment, transmission control circuit 200 may compare a calculated fuel savings to a threshold fuel savings. In another embodiment, transmission control circuit 200 may compare a calculated power savings to a threshold power savings. In yet another embodiment, transmission control circuit 200 may compare a calculated cycle time to a threshold cycle time. If one or more of the calculated parameters fall below the corresponding threshold, then transmission control circuit 200 may exit sequence 600 and return to sequence 500 (FIG. 5). Such comparisons may ensure that the cycle time, fuel savings, speed drop, and other performance characteristics are acceptable.

At block 618, transmission control circuit 200 cycles multi-speed planetary transmission 150 between the climb gear and the upshift gear. This cycling may be performed, more specifically, by shift criteria logic 400 of transmission control circuit 200 (FIG. 3B).

In one embodiment, transmission control circuit 200 cycles multi-speed planetary transmission 150 based on engine speed, such as by monitoring speed sensor 142 (FIG. 1). When engine speed reaches the maximum engine speed (from block 602), then transmission control circuit 200 upshifts multi-speed planetary transmission 150 from the climb gear to the upshift gear. When engine speed reaches the minimum engine speed (from block 606), then transmission control circuit 200 downshifts multi-speed planetary transmission 150 from the upshift gear to the climb gear. This embodiment is consistent with the graphical example of FIG. 10, where upshifts occur at the maximum engine speed and downshifts occur at the minimum engine speed.

In another embodiment, transmission control circuit 200 cycles multi-speed planetary transmission 150 based on the calculated savings ratio (from block 612). When engine speed reaches the maximum engine speed (from block 602), then transmission control circuit 200 upshifts multi-speed planetary transmission 150 from the climb gear to the upshift gear. This upshift may start a cycle timer. When the time spent in the upshift gear expires (i.e., the numerator of the savings ratio), then transmission control circuit 200 downshifts multi-speed planetary transmission 150 from the upshift gear to the climb gear for the remainder of the total cycle time. If the calculated savings ratio is 20/32, for example, then transmission control circuit 200 would operate multi-speed planetary transmission 150 in the upshift gear for 20 seconds and in the climb gear for the remaining 12 seconds of the total 32 seconds cycle time.

The gear shifts that occur at block 618 may override any gear shifts requested by the operator at transmission shift selector 310 (FIG. 1). In this way, the driver may be prevented from staying in the climb gear when cycling to the upshift gear would cause minimal deceleration while also providing desirable fuel savings.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicular system configured to climb a hill, the system comprising:
   a multi-speed automatic transmission including an input member and an output member operatively coupled to the input member, the multi-speed automatic transmission being configurable in a plurality of forward speed ratios between the input member and the output member, the plurality of forward speed ratios including at least a first forward speed ratio and a second forward speed ratio; and
   a control circuit operatively coupled to the multi-speed automatic transmission, the control circuit configuring the multi-speed automatic transmission to establish each of the plurality of forward speed ratios, and the control circuit identifying a hill climb event when an upshift from the first forward speed ratio to the second forward speed ratio at a first engine speed would decelerate the vehicular system on the hill from a first vehicle speed, wherein at the first engine speed the first forward speed ratio is capable of maintaining the first vehicle speed up the hill.

2. The system of claim 1, wherein the control circuit determines a required engine load power to maintain the first vehicle speed up the hill.

3. The system of claim 2, wherein the control circuit determines:
   a maximum engine power in the first forward speed ratio corresponding to the required engine load power and a maximum engine speed; and
   a minimum engine power in the second forward speed ratio corresponding to the required engine load power and a minimum engine speed.

4. The system of claim 3, wherein the control circuit identifies the hill climb event when the maximum engine speed in the first forward speed ratio is less than the minimum engine speed in the second forward speed ratio.

5. The system of claim 1, wherein the control circuit prevents the upshift of the multi-speed automatic transmission from the first forward speed ratio to the second forward speed ratio in response to the hill climb event.

6. The system of claim 1, wherein the control circuit limits an engine speed in response to the hill climb event.

7. A vehicular system configured to climb a hill, the system comprising:
   a multi-speed automatic transmission including an input member and an output member operatively coupled to the input member, the multi-speed automatic transmission being configurable in a plurality of forward speed ratios between the input member and the output member, the plurality of forward speed ratios including at least a first forward speed ratio and a second forward speed ratio; and a control circuit operatively coupled to the multi-speed automatic transmission, the control circuit configuring the multi-speed automatic transmission to establish each of the plurality of forward speed ratios, and the control circuit identifying a hill climb event when an upshift from the first forward speed ratio to the second forward speed ratio would decelerate the vehicular system on the hill, wherein the control circuit cycles the multi-speed automatic transmission between the first forward speed ratio and the second forward speed ratio in response to the hill climb event.

8. The system of claim 7, wherein the control circuit determines:
a maximum vehicle acceleration in the first forward speed ratio at a target output speed; and
a maximum vehicle acceleration in the second forward speed ratio at the target output speed.

9. The system of claim 8, wherein:
the maximum vehicle acceleration in the first forward speed ratio at the target output speed is non-negative; and
the maximum vehicle acceleration in the second forward speed ratio at the target output speed is negative.

10. The system of claim 9, wherein the control circuit calculates a time spent in the second forward speed ratio over a total cycle time according to the following formula:

$$\frac{E}{E-F}$$

wherein:
E=the maximum vehicle acceleration in the first forward speed ratio at the target output speed; and
F=the maximum vehicle acceleration in the second forward speed ratio at the target output speed.

11. A vehicular system configured to climb a hill, the system comprising:
a multi-speed automatic transmission including an input member and an output member operatively coupled to the input member, the multi-speed automatic transmission being configurable in a plurality of forward speed ratios between the input member and the output member, the plurality of forward speed ratios including at least a first forward speed ratio and a second forward speed ratio, the system having a first operating range in which the system achieves non-negative acceleration up the hill in the first forward speed ratio and a second operating range in which the system achieves non-negative acceleration up the hill in the second forward speed ratio; and
a control circuit operatively coupled to the multi-speed automatic transmission, the control circuit configuring the multi-speed automatic transmission to establish each of the plurality of forward speed ratios, and the control circuit identifying a hill climb event when the first operating range and the second operating range are mutually exclusive.

12. The system of claim 11, wherein:
the first operating range includes a maximum engine power at which the system achieves non-negative acceleration up the hill in the first forward speed ratio; and
the second operating range includes a minimum engine power at which the system achieves non-negative acceleration up the hill in the second forward speed ratio.

13. The system of claim 12, wherein the maximum engine power in the first forward speed ratio is less than the minimum engine power in the second forward speed ratio during the hill climb event.

14. The system of claim 12, wherein, before shifting from the first forward speed ratio to the second forward speed ratio, the control circuit evaluates at least one vehicle condition selected from the group consisting of: a deceleration in the second forward speed ratio, a speed in the second forward speed ratio, a fuel savings in the second forward speed ratio, and a power savings in the second forward speed ratio.

15. A method for operating a vehicle having a multi-speed automatic transmission operable in a first forward speed ratio and a second forward speed ratio, the method comprising the steps of:
determining a maximum speed capable of achieving a non-negative acceleration on a hill in the first forward speed ratio, wherein the maximum speed is one of a maximum engine speed and a maximum transmission output speed;
determining a minimum speed capable of achieving a non-negative acceleration on the hill in the second forward speed ratio, wherein the minimum speed is a corresponding one of a minimum engine speed and a minimum transmission output speed; and
identifying a hill climb event when the maximum speed is less than the minimum speed.

16. The method of claim 15, further comprising preventing an upshift of the multi-speed automatic transmission from the first forward speed ratio to the second forward speed ratio in response to the hill climb event.

17. The method of claim 15, further comprising limiting an engine speed in response to the hill climb event.

18. The method of claim 15, further comprising cycling the multi-speed automatic transmission between the first forward speed ratio and the second forward speed ratio in response to the hill climb event.

19. The method of claim 18, wherein a time spent in the second forward speed ratio increases as an estimated deceleration in the second forward speed ratio decreases.

20. The method of claim 15, further comprising the steps of:
automatically performing a response sequence during the hill climb event; and
terminating the response sequence after the hill climb event.

* * * * *